US011225137B1

(12) United States Patent
De La Rosa et al.

(10) Patent No.: US 11,225,137 B1
(45) Date of Patent: Jan. 18, 2022

(54) VEHICLE AIR INDUCTION ASSEMBLY

(71) Applicant: Nissan North America, Inc., Franklin, TN (US)

(72) Inventors: Christian De La Rosa, Toluca (MX); Cesar Sanchez, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 18 days.

(21) Appl. No.: 16/917,539

(22) Filed: Jun. 30, 2020

(51) Int. Cl.
*B60K 13/02* (2006.01)
*B60R 13/00* (2006.01)
*F02M 35/024* (2006.01)
*F02M 35/10* (2006.01)

(52) U.S. Cl.
CPC ............ *B60K 13/02* (2013.01); *B60R 13/005* (2013.01); *F02M 35/024* (2013.01); *F02M 35/10* (2013.01); *F02M 35/10144* (2013.01)

(58) Field of Classification Search
CPC .... B60K 13/02; B60R 13/005; F02M 35/024; F02M 35/10144; F02M 35/10; F02M 35/10013; F02M 35/10262; F02M 35/10295
See application file for complete search history.

(56) References Cited

U.S. PATENT DOCUMENTS

| 4,420,057 | A | * | 12/1983 | Omote | B60K 13/02 180/68.3 |
| 5,564,513 | A | | 10/1996 | Wible et al. | |
| 5,860,685 | A | * | 1/1999 | Horney | B60K 13/02 293/113 |
| 9,211,791 | B2 | * | 12/2015 | Laakso | B60K 13/02 |
| 2003/0042055 | A1 | * | 3/2003 | Suwa | B60K 11/08 180/68.3 |

FOREIGN PATENT DOCUMENTS

DE 102008064519 A1 7/2010

* cited by examiner

*Primary Examiner* — Syed O Hasan
(74) *Attorney, Agent, or Firm* — Global IP Counselors, LLP

(57) ABSTRACT

A vehicle air induction assembly includes an air guide, an air duct and a bracket member. The air guide is configured to be connected to a vehicle fascia. The air duct is configured to be connected to the air guide. The air duct is configured to supply air to an engine air filter. The bracket member is connected to the air guide. The bracket member has a front wall facing in a forward direction of a vehicle, a rear wall facing in a rearward direction of the vehicle, and an upper wall connecting the front wall and the rear wall. A first air inlet in fluid communication with the air duct is defined by a surface of the air guide and the front, rear and upper walls of the bracket member. The first air inlet faces in a lateral direction of the vehicle.

20 Claims, 7 Drawing Sheets

VEHICLE AIR INDUCTION ASSEMBLY

BACKGROUND

Field of the Invention

The present invention generally relates to a vehicle air induction assembly. More specifically, the present invention relates to a vehicle air induction assembly that facilitates preventing foreign materials, such as snow, from being supplied to the engine air filter.

Background Information

Air is drawn in by a vehicle and is supplied to the engine for combustion. The air passes through an engine air filter to remove dirt, debris and other foreign materials from the air supply and to prevent such materials from reaching the engine. A reduction in the supply of air to the engine can negatively impact the performance of the engine. For example, snow can be drawn in with the air and can accumulate in the engine air filter, thereby resulting in freezing or otherwise reducing the flow of air through the engine air filter.

SUMMARY

One object of the disclosure is to provide a vehicle air induction assembly that facilitates preventing dirt, debris and other foreign materials, such as snow, drawn in with external air from being supplied to the engine air filter.

In view of the state of the known technology, one aspect of the present invention is to provide a vehicle air induction assembly including an air guide, an air duct and a bracket member. The air guide is configured to be connected to a vehicle fascia. The air duct is configured to be connected to the air guide. The air duct is configured to supply air to an engine air filter. The bracket member is connected to the air guide. The bracket member has a front wall facing in a forward direction of a vehicle, a rear wall facing in a rearward direction of the vehicle, and an upper wall connecting the front wall and the rear wall. A first air inlet in fluid communication with the air duct is defined by a surface of the air guide and the front, rear and upper walls of the bracket member. The first air inlet faces in a lateral direction of the vehicle.

Another aspect of the present invention is to provide a vehicle air intake system including a vehicle fascia and a vehicle air induction assembly connected to the vehicle fascia. The vehicle air induction assembly includes an air guide, an air duct and a bracket member. The air guide is connected to the vehicle fascia. The air duct is connected to the air guide. The air duct is configured to supply air to an engine air filter. The bracket member is connected to the air guide and to the air duct. The bracket member has a front wall facing in a forward direction of a vehicle, a rear wall facing in a rearward direction of the vehicle, and an upper wall connecting the front wall and the rear wall. A first air inlet in fluid communication with the air duct is defined by a surface of the air guide and the front, rear and upper walls of the bracket member. The first air inlet faces in a lateral direction of the vehicle.

Also other objects, features, aspects and advantages of the disclosed vehicle air induction assembly will become apparent to those skilled in the art from the following detailed description, which, taken in conjunction with the annexed drawings, discloses exemplary embodiments of the vehicle air induction assembly.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
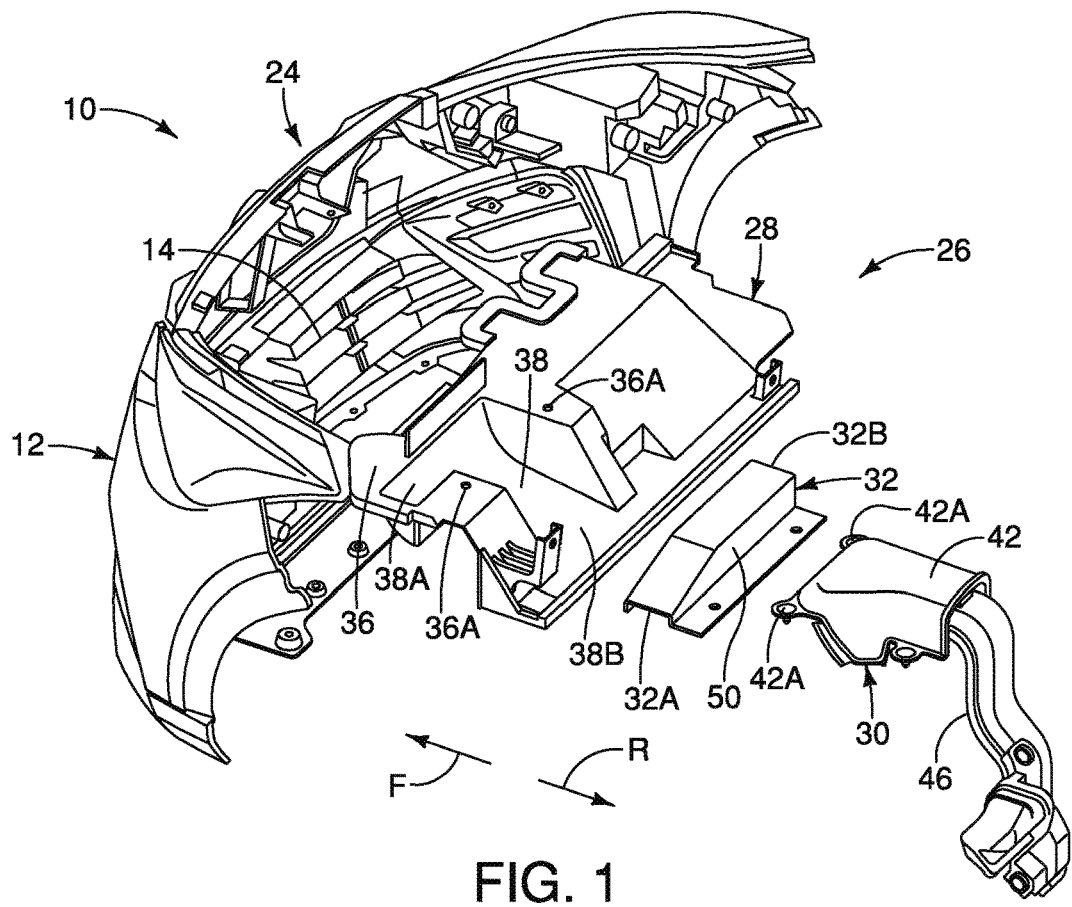
FIG. 1 is an exploded rear assembly view of a vehicle air induction assembly in accordance with an exemplary embodiment of the present invention.
Figure 2:
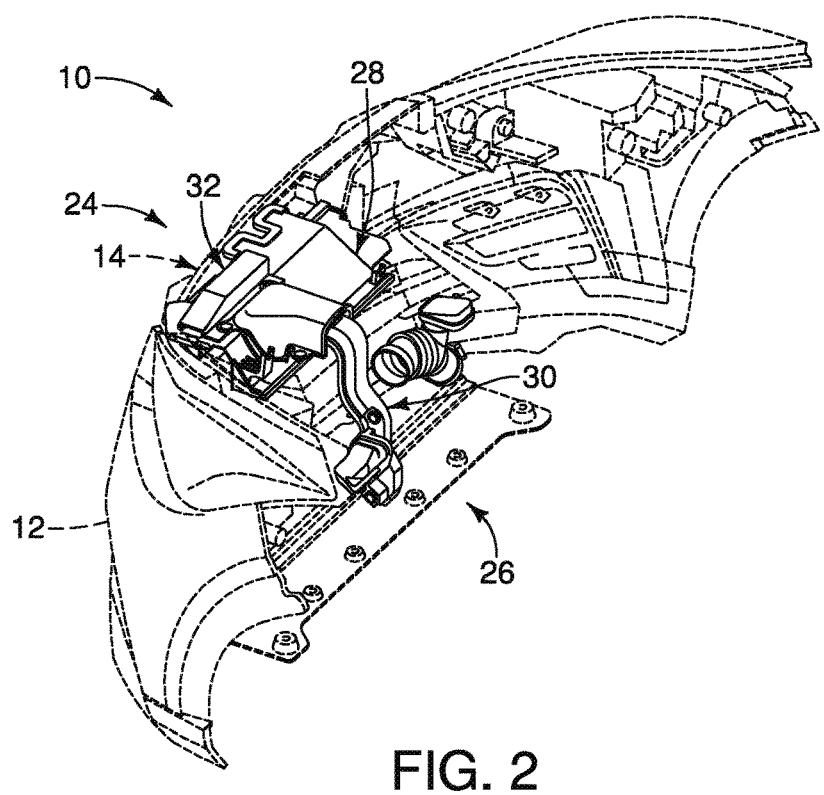
FIG. 2 is a rear perspective view of the vehicle air induction assembly of FIG. 1 connected to a fascia of a vehicle.

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-4, a vehicle 10 includes a front vehicle fascia 12 and a grille member 14 connected thereto. The grille member 14 covers an opening 16 in the front fascia 12. A mesh portion 18 extends within an area defined by a frame member 20 of the grille member 14. A plurality of openings 22 are disposed in the mesh portion 18 and allow air to flow therethrough and into an engine compartment of the vehicle 10. The front fascia 12 is attached to a vehicle body structure of the vehicle 10 in a conventional manner. The grille member 14 is connected to the front fascia 12 in a conventional manner.

A vehicle air intake assembly 24 includes the vehicle fascia 12 and a vehicle air induction assembly 26 connected thereto. The vehicle air induction assembly 26 includes an air guide 28, an air duct 30 and a bracket member 32.

Figures 3, 4:
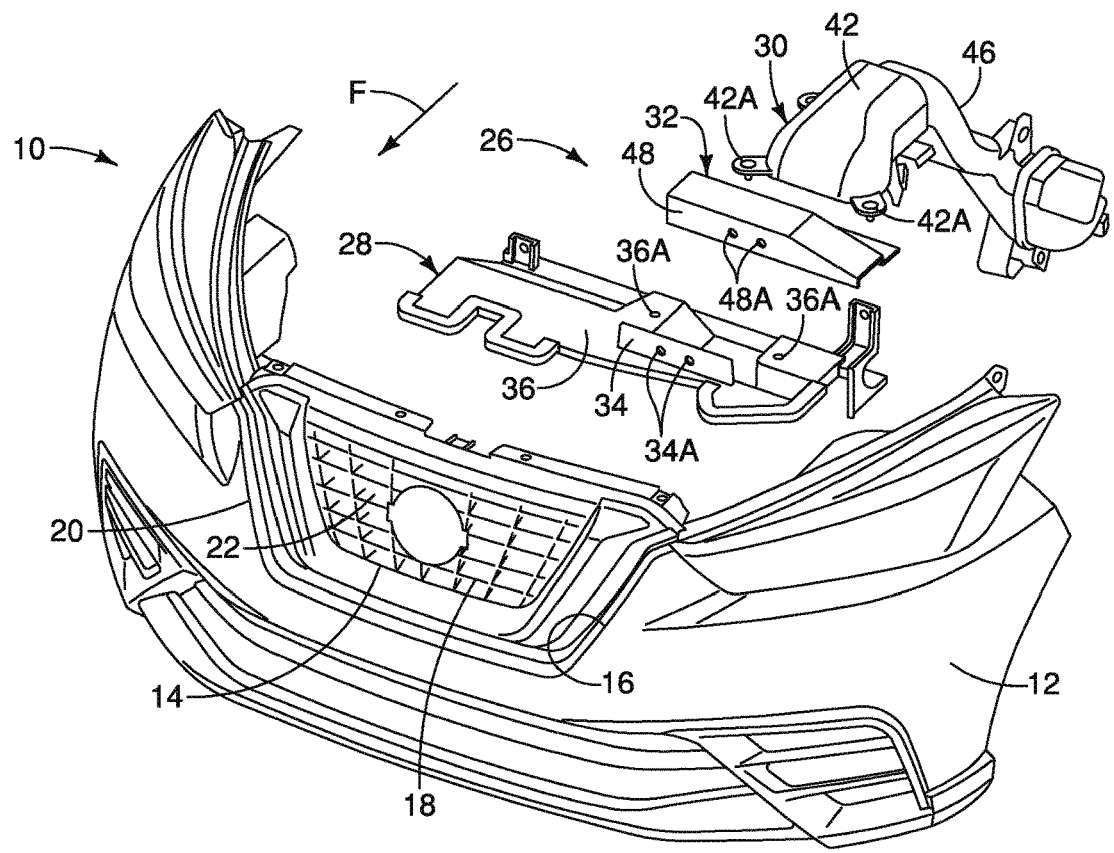
FIG. 3 is an exploded front assembly view of the vehicle air induction assembly of FIG. 1.
FIG. 4 is a front perspective view of the vehicle air induction assembly of FIG. 1 connected to the fascia of the vehicle.

In FIGS. 1 and 4 several directions relative to the vehicle 10 are shown in order to define orientations of the various features of the vehicle 10 and the vehicle air induction assembly 26. Specifically, the vehicle 10 defines a longitudinal center line CL that extends in a lengthwise direction of the vehicle 10 along a central portion of the vehicle 10, as shown in FIG. 4. A forward direction F and a rearward direction R relative to the vehicle 10 are indicated by the depicted arrows in FIG. 1. A lateral direction L relative to the vehicle 10 is indicated by the depicted arrows in FIG. 1. An inboard direction LI and an outboard direction LO relative to the longitudinal center line CL are also shown in FIG. 4.

Figure 9:
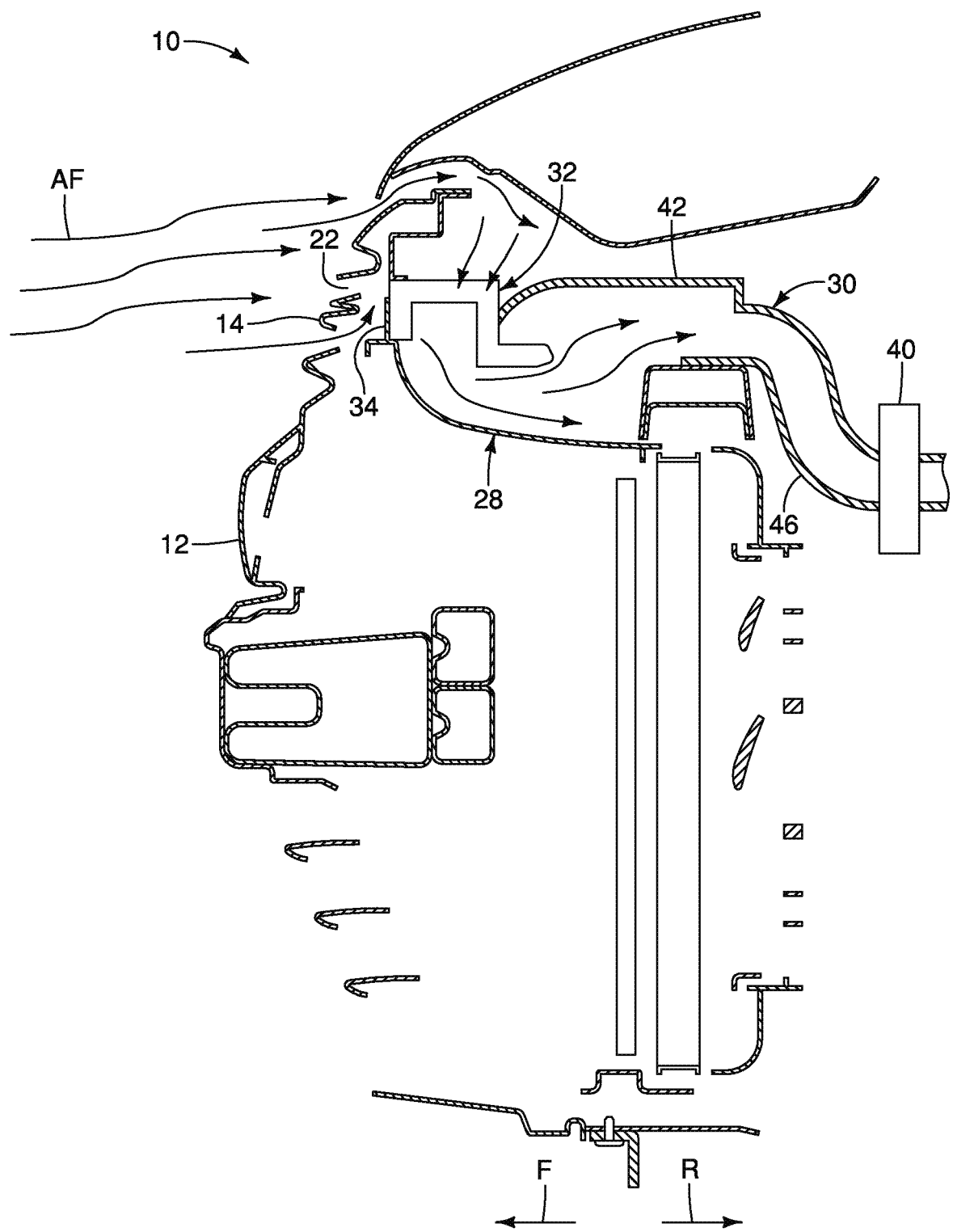
FIG. 9 is a side elevational view in cross section of the vehicle air induction assembly connected to the fascia of the vehicle of FIG. 2.
Figure 10:
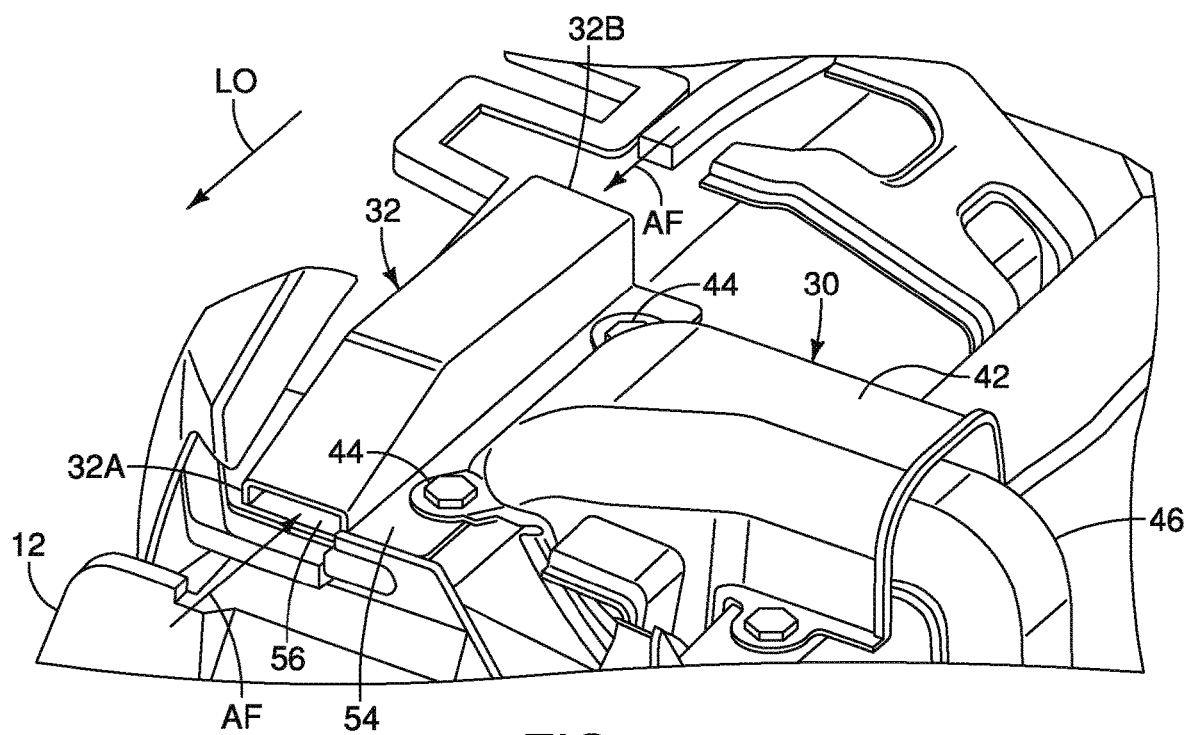
FIG. 10 is a perspective view of the vehicle air induction assembly of FIG. 1 illustrating a first air inlet.
Figure 11:
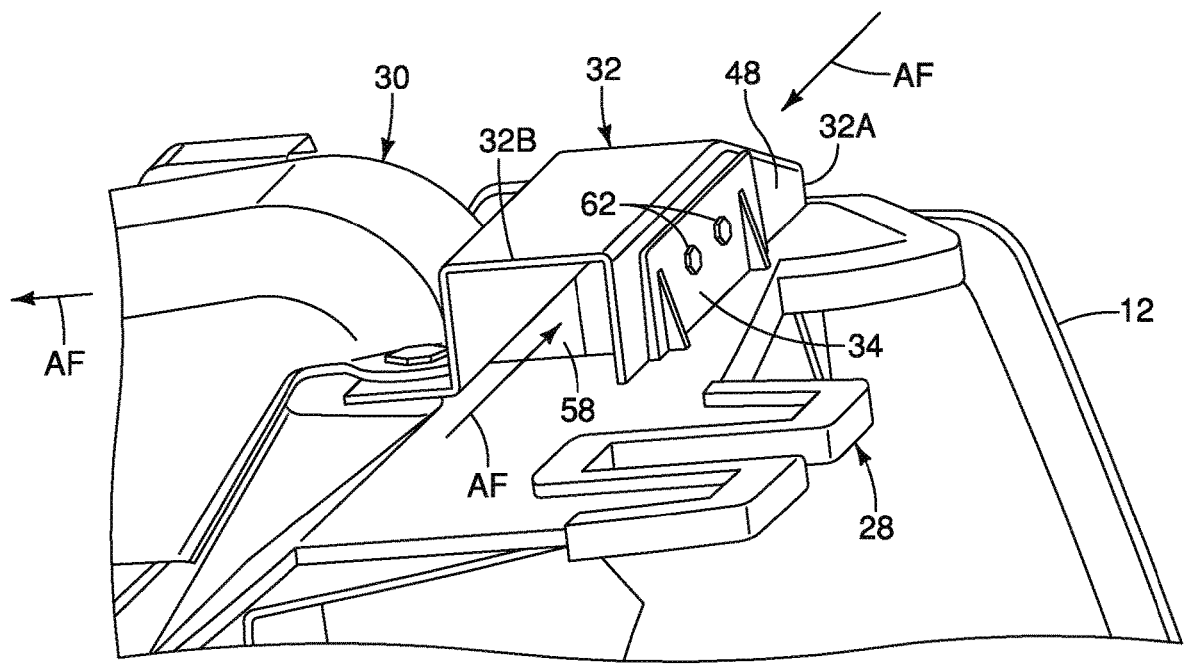
FIG. 11 is a perspective view of the vehicle air induction assembly of FIG. 1 illustrating a second air inlet.

The air guide 28 is configured to be connected to the vehicle fascia 12, as shown in FIGS. 1-4 and 9-11. The air guide 28 is connected to the vehicle fascia 12 in any suitable manner, such as with fasteners. A tab 34 extends outwardly from an upper surface 36 of the air guide 28. The tab 34 extends along the upper surface of the air guide 28 in the vehicle lateral direction L, and preferably extends substantially perpendicularly to the upper surface 36, as shown in FIGS. 1, 9 and 11. At least one fastener opening 34A is disposed in the tab 34, as shown in FIG. 3. Preferably, two fastener openings 34A are disposed in the tab 34, as shown in FIG. 3.

A recessed portion 38 of the air guide 28 is disposed rearwardly of the tab 34, as shown in FIGS. 1 and 3. The recessed portion 38 is substantially L-shaped, but can have any suitable shape. The recessed portion 38 has a first portion 38A extending in the lateral direction L and a second portion 38B extending in the rearward direction R from the first portion 38A. Preferably, the tab 34 has a width in the vehicle lateral direction less than a width of the first portion 38A, although the width of the tab 34 can be greater than the width of the first portion 38A. The tab 34 is preferably wider than a width of the second portion 38B, although the tab 34 can have a width equal to or less than the width of the second portion 38B. Fastener openings 36A are disposed in the upper surface 36 of the air guide 28 on opposite sides of the second portion 38B of the recessed portion 38. The fastener openings 36A are disposed in the rearward direction R relative to the first portion 38A of the recessed portion 38.

The air duct 30 is configured to be connected to the air guide 28, as shown in FIGS. 1-4 and 9-11. The air duct 30 is configured to supply air to an engine air filter 40, as shown in FIG. 9. A cover member 42 of the air duct 30 has fastener openings 42A aligned with the fastener openings 36A in the upper surface 36 of the air guide 28 such that a fastener 44 can secure the air duct 30 to the air guide 28. The cover member 42 of the air duct 30 is disposed above the second portion 38B of the recessed portion 38 of the air guide 28 to define an air flow path therebetween. The air flow path is in fluid communication with an air duct member 46 of the air duct to supply air to the engine air filter 40.

Figure 7:
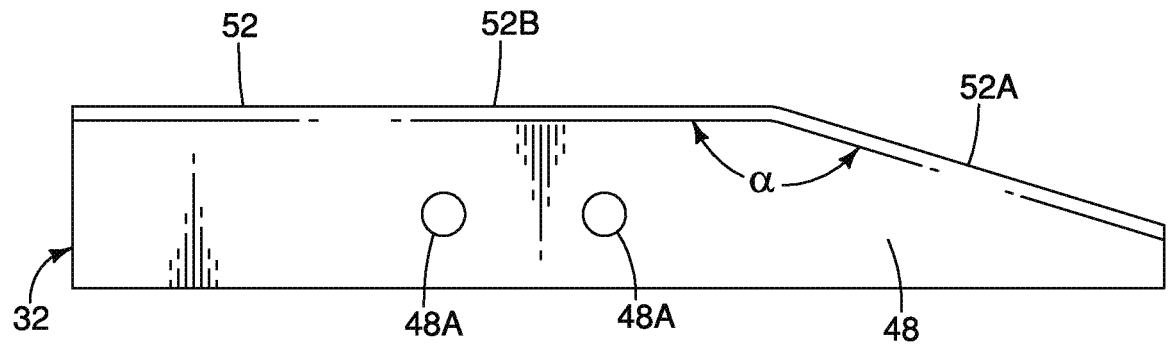
FIG. 7 is a side elevational view of the bracket member of FIG. 5.
Figure 8:
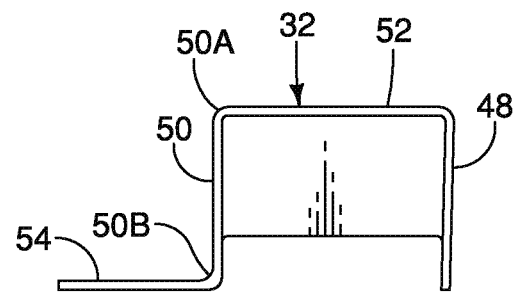
FIG. 8 is a rear elevational view of the bracket member of FIG. 5.

The bracket member 32 is connected to the air guide 28, as shown in FIGS. 1-4 and 9-11. The bracket member 32 has a front wall 48 facing in the forward direction F of the vehicle 10, a rear wall 50 facing in the rearward direction R of the vehicle 10, and an upper wall 52 connecting the front wall 48 and the rear wall 50, as shown in FIGS. 5-8. The upper wall 52 extends between an upper end 48A of the front wall 48 and an upper end 50A of the rear wall 50. The rear wall 50 preferably extends substantially perpendicularly to the upper wall 52, and the front wall 48 preferably extends at an angle less than 90 degrees to the upper wall 52, such as at an angle of 88.5 degrees. In other words, as shown in FIG. 8, the front wall 48 and the rear wall 50 extend from the upper wall 52 at different angles. At least one fastener opening 48A is disposed in the front wall 48, as shown in FIGS. 3 and 7. Preferably, two fastener openings 48A are disposed in the front wall 48, as shown in FIGS. 3 and 7, although the front wall 48 can have any suitable number of fastener openings 48A. The upper wall 52 is preferably extends further from the upper surface 36 of the air guide 28 than the tab 34, as shown in FIG. 11. In other words, the front wall 48 extends further vertically than the tab 34.

The upper wall 52 of the bracket member 32 has a first portion 52A and a second portion 52B, as shown in FIGS. 5-8. The second portion 52B is substantially planar. The first portion 52A tapers downwardly from the second portion 52B to be angularly disposed relative to the second portion 52B. An angle α is formed between the first and second portions 52A and 52B, as shown in FIG. 7, and is less than 180 degrees. Preferably, the angle α is approximately 163 degrees.

Figure 5:
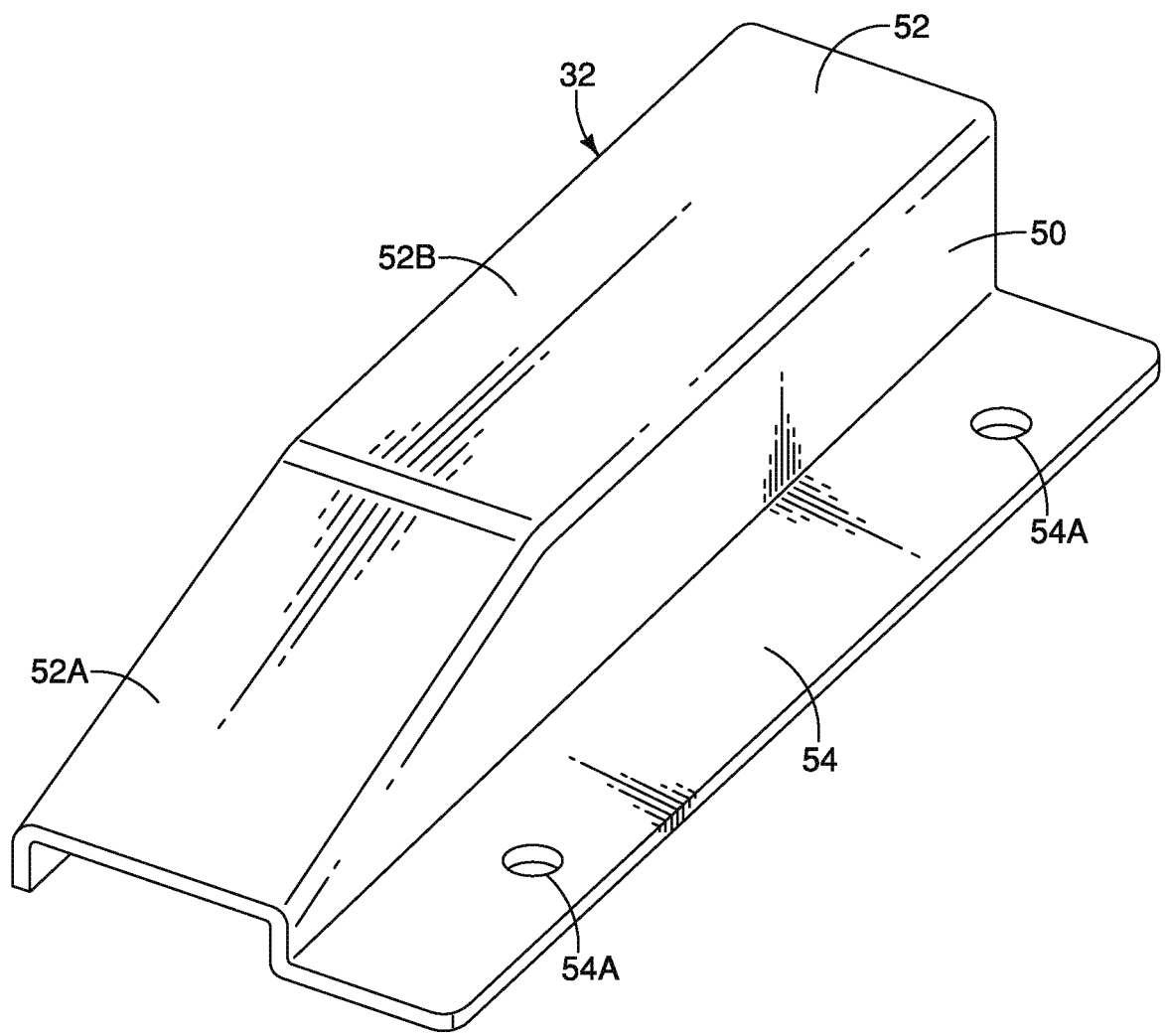
FIG. 5 is a perspective view of a bracket member of the vehicle air induction assembly of FIG. 1.
Figure 6:
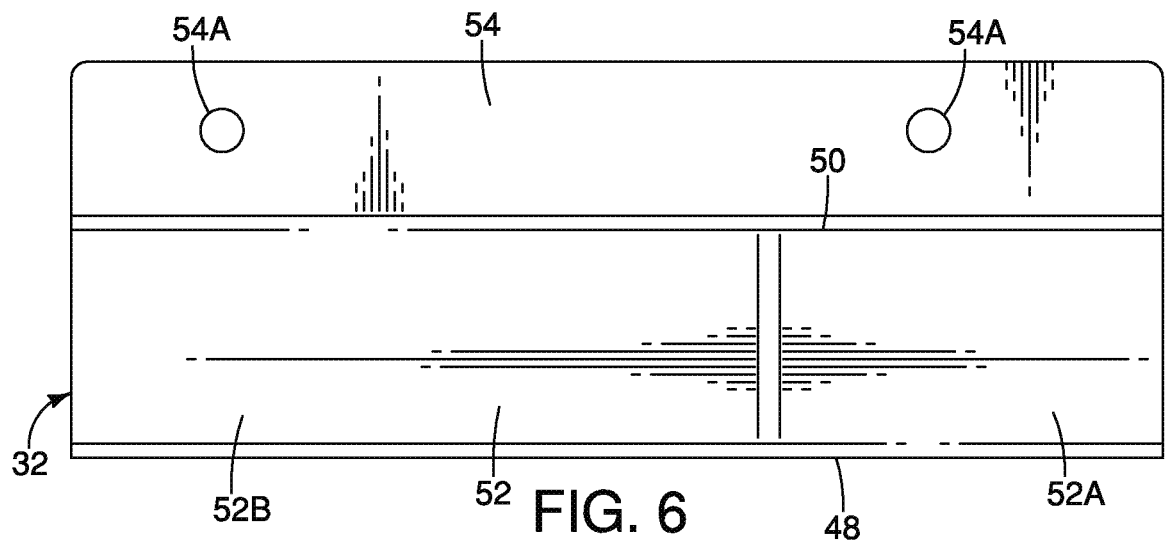
FIG. 6 is a top plan view of the bracket member of FIG. 5.

A connecting member 54 of the bracket member 32 extends outwardly from a lower end 50B of the rear wall 50 of the bracket member 32, as shown in FIGS. 5, 6 and 8. The connecting member 54 preferably extends substantially perpendicularly from the lower end 50B of the rear wall 50. At least one fastener opening 54A is disposed in the connecting member 54. Two fastener openings 54A are disposed in the connecting member 54, as shown in FIG. 5, although the connecting member 54 can have any suitable number of fastener openings 54A.

The bracket member 32 is connected to the air guide 28, as shown in FIGS. 2, 4 and 9-11. The front wall 48 of the bracket member 32 is disposed forward of the first portion 38A of the recessed portion 38 of the air guide 28, and the rear wall 50 of the bracket member 32 is disposed rearward of the first portion 38A of the recessed portion 38 of the air guide 28. The front wall 48 of the bracket member 32 is disposed rearward of the tab 34, as shown in FIG. 4. The air flow path is defined by the air guide 28 and the bracket member 28 in this portion of the air induction assembly 26.

As shown in FIGS. 1-4 and 9-11, the air guide 28 is connected to the vehicle fascia 12 in any suitable manner. The bracket member 32 is connected to the air guide 28. Each of the fastener openings 48A in the front wall 48 of the bracket member 32 is aligned with a corresponding fastener opening 34A in the tab 34 of the air guide 28 and each of the fastener openings 54A in the connecting member 54 of the bracket member 32 is aligned with a corresponding fastener opening 36A in the upper surface 36 of the air guide 28 to properly position the bracket member 32 relative to the air guide 28. Fasteners 62 are received by the aligned fastener openings 34A and 48A, and fasteners 44 are received by the aligned fastener openings 36A and 54A to secure the bracket member 32 to the air guide 28. The front wall 48 of the bracket member 32 faces in the forward direction F of the vehicle 10. The rear wall 50 of the bracket member 32 faces in the rearward direction R of the vehicle 10.

The air duct 30 is connected to the air guide 28, as shown in FIGS. 1-4 and 9-11. Each of the plurality of fastener openings 42A in the air duct 30 is aligned with a corresponding fastener opening in the air guide 28 to properly position the air duct 30 relative to the air guide 28. Preferably, each of the plurality of fastener openings 42A in the air duct 30 is aligned with a corresponding fastener opening 36A in the air guide 28 and a corresponding fastener opening 54A in the connecting member 54 of the bracket member 32 to properly position the air duct 30 relative to the air guide 28 and the bracket member 32. As shown in FIGS. 10 and 11, the connecting member 54 of the bracket member 32 is disposed between the air guide 28 and the air duct 30. The fasteners are removable such that the bracket member 32 can be removed and/or replaced as necessary.

The bracket member 32 and the air duct 30 cover the recessed portion 38 of the air guide 28, as shown in FIGS. 2, 4, 10 and 11. The bracket member 32 substantially covers the first portion 38A of the recessed portion 38 of the air guide, and the air duct 30 substantially covers the second portion 38B of the recessed portion 38. The first portion 38A of the recessed portion 38 of the air guide 38 is disposed below the upper wall 52 of the bracket member 32. The air flow path of the air induction assembly 26 is defined by the air guide 28 and the bracket member 32 in the first portion of the air induction assembly 26, and the air flow path is defined by the air guide 28 and the cover member 42 of the air duct 30 in a second portion of the air induction assembly 26. The second portion of the air flow path of the air induction assembly 26 is in fluid communication with the air duct member 46 of the air duct 30.

A first air inlet 56 of the air induction assembly 26 is disposed at a first end 32A of the bracket member 32, as shown in FIG. 10. The first air inlet 56 is defined by the upper surface 36 of the air guide 28, and the front wall 48, the rear wall 50 and the upper wall 52 of the bracket member 32. The first air inlet 56 faces in the lateral direction L of the vehicle 10. The first air inlet 56 faces in the lateral outboard direction LO of the vehicle 10. Preferably, the first portion 52A of the upper wall 52 defines the first air inlet 56 such that the first air inlet 56 faces away from the vehicle centerline CL. The first air inlet 56 is in fluid communication with the air duct member 46 of the air duct 30.

A second air inlet 58 in the air induction assembly 26 is disposed at a second end 32B of the bracket member 32, as shown in FIG. 11. The second air inlet 58 is defined by the upper surface 36 of the air guide 28, and the front wall 48, the rear wall 50 and the upper wall 52 of the bracket member 32. Preferably, the second portion 52B of the upper wall 52 defines the second air inlet 58. The second air inlet 58 faces in the lateral direction of the vehicle 10. The second air inlet 58 faces in the later inboard direction LI of the vehicle 10, such that the second air inlet 58 faces toward the vehicle centerline CL. The second air inlet 58 is in fluid communication with the air duct member 46 of the air duct 30.

The air flows into the engine compartment of the vehicle 10 through the grille member 14, as indicated by the arrows AF in FIG. 9. The air flows into the air induction assembly 26 through the first and second air inlets 56 and 58. The air flows into the first recessed portion 38A and then into the second recessed portion 38B. The air flows into the air duct member 46 of the air duct 30 and through the air filter 40 to be supplied to the engine. The air flows into the first and second air inlets 56 and 58 substantially perpendicularly to the air flowing through the grille member 14, as indicated by the arrows AF in FIGS. 9-11. The first and second air inlets 56 and 58 are disposed substantially perpendicularly to the air flowing through the grille member 14 and prevent air from flowing straight into the air duct 30. The configuration of the air induction assembly 26 facilitates preventing foreign materials, such as snow, drawn in with the air AF from being supplied to the engine air filter 40. The air flows into the first and second air inlets 56 and 58 substantially perpendicularly to the air flowing into the air duct member 46 of the air duct 30, as indicated by the arrows AF in FIGS. 9-11. The air flowing through the air induction assembly 26 flows through a first portion defined by the air guide 28 and the bracket member 32, a second portion defined by the air guide 28 and the cover member 42 of the air duct 30, and a third portion defined by the air duct member 46 of the air duct 30, such that the first, second and third portions are in fluid communication.

Figure 12:
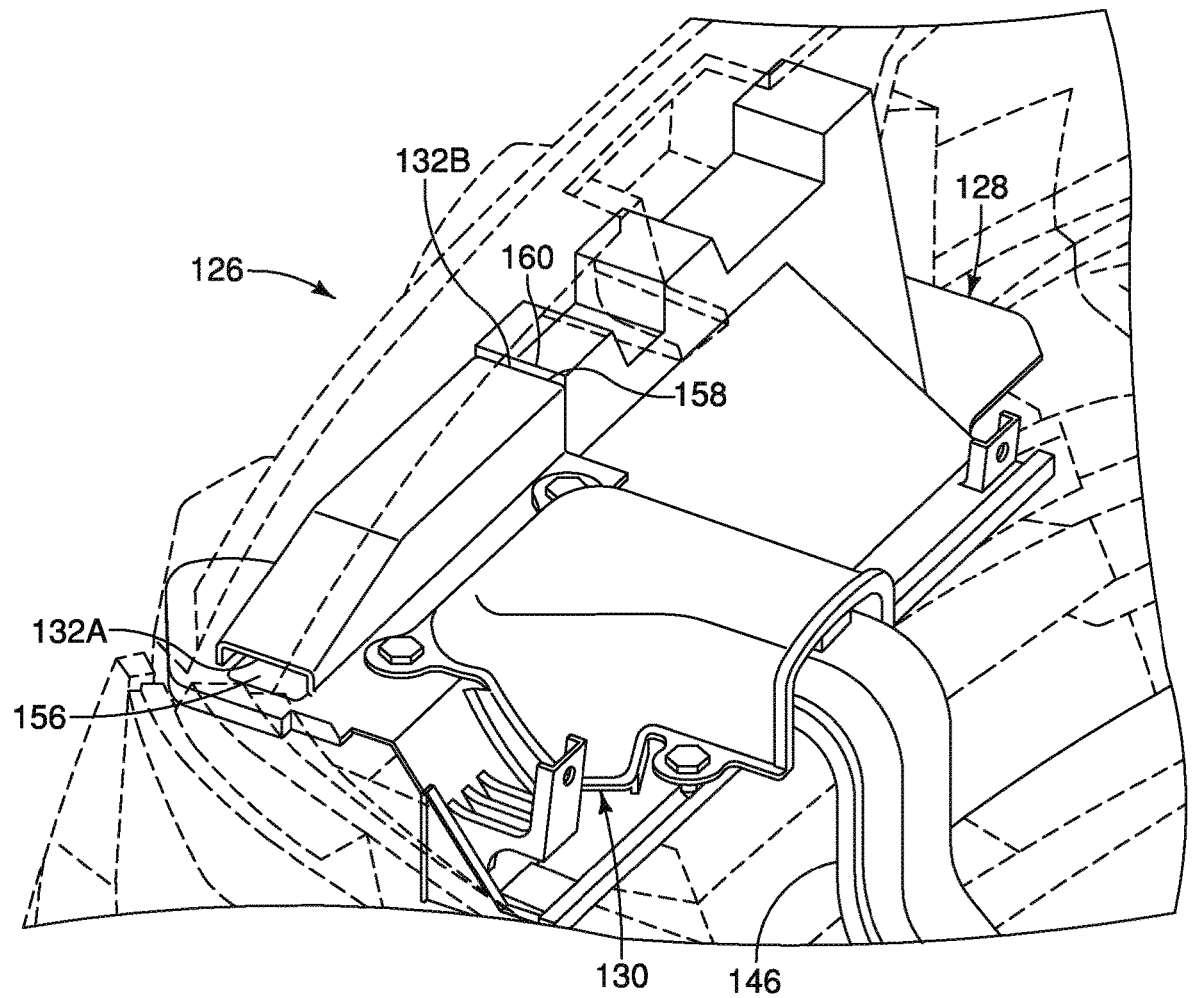
FIG. 12 is rear perspective view of a vehicle air induction assembly in accordance with another exemplary embodiment of the present invention.

As shown in FIG. 12, a vehicle air induction assembly 126 in accordance with another illustrated exemplary embodiment of the present invention is substantially similar to the vehicle air induction assembly 26 of the exemplary embodiment illustrated in FIGS. 1 to 11 except for the differences described below. Similar parts are identified with similar reference numerals, except increased by 100 (i.e., 1xx, accordingly).

The vehicle air induction assembly 126 is substantially similar to the air induction assembly 26 except that the air induction assembly 126 only has the first air inlet 156. The second air inlet 158 at the second end 132B of the bracket member 132 is covered by a blocking member 160 of the air guide 128 such that the second air inlet 158 is not in fluid communication with the air duct 130. The blocking member 160 has a width and a height at least equal to the width and height of the second air inlet 158, such that air is substantially prevented from entering the air induction assembly 126 through the second air inlet 158. Air enters the air induction assembly 126 through the first air inlet 156, and is supplied through the duct member 146 to the engine air inlet 40 (FIG. 9). The second end 132B of the bracket member 132 contacting the blocking member 160 of the air guide 130 further facilitates properly positioning the bracket member 132 during installation.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle frame equipped with the vehicle air induction assembly. Accordingly, these terms, as utilized to describe the present invention should be interpreted relative to a vehicle frame equipped with the vehicle air induction assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air induction assembly comprising:
an air guide configured to be connected to a vehicle fascia;
an air duct configured to be connected to the air guide, the air duct being configured to supply air to an engine air filter; and
a bracket member connected to the air guide, the bracket member having a front wall facing in a forward direction of a vehicle, a ear wall facing in a rearward direction of the vehicle, and an upper wall connecting the front wall and the rear wall,
a first air inlet in fluid communication with the air duct being defined by a surface of the air guide and the front, rear and upper walls of the bracket member, the first air inlet facing in a lateral direction of the vehicle.

2. The vehicle air induction assembly according to claim 1, wherein
a second air inlet in fluid communication with the air duct is defined by the surface of the air guide and the front, rear and upper walls of the bracket member, the second air inlet facing in the lateral direction of the vehicle.

3. The vehicle air induction assembly according to claim 2, wherein
the first air inlet being disposed at a first end of the bracket member, and the second air inlet being disposed at a second end of the bracket member.

4. The vehicle air induction assembly according to claim 3, wherein
the second air inlet is covered by a blocking member such that the second air inlet is not in fluid communication with the air duct.

5. The vehicle air induction assembly according to claim 1, wherein
a connecting member extends outwardly from the rear wall of the bracket member, and has a plurality of fastener openings therein.

6. The vehicle air induction assembly according to claim 5, wherein
each of the plurality of fastener openings in the connecting member of the bracket member is configured to be aligned with a corresponding fastener opening in the air guide.

7. The vehicle air induction assembly according to claim 5, wherein
each of the plurality of fastener openings in the connecting member of the bracket member is configured to be aligned with a corresponding fastener opening in the air guide and a corresponding fastener opening in the air duct.

8. The vehicle air induction assembly according to claim 1, wherein
a tab extends outwardly from the surface of the air guide, the front wall of the bracket member being disposed rearwardly of the tab.

9. The vehicle air induction assembly according to claim 8, wherein a plurality of fastener openings are disposed in the front wall of the bracket member.

10. The vehicle air induction assembly according to claim 9, wherein
each of the plurality of fastener openings in the front wall of the bracket member is configured to be aligned with a corresponding fastener opening in the tab.

11. The vehicle air induction assembly according to claim 10, wherein
a first portion of the upper wall of the bracket member tapers toward the surface of the air guide, and a second portion of the upper wall is substantially planar.

12. The vehicle air induction assembly according to claim 11, wherein
the first portion of the upper wall defines the first air inlet.

13. The vehicle air induction assembly according to claim 12, wherein
a substantially planar portion of the upper wall of the bracket member defines the second air inlet.

14. The vehicle air induction assembly according to claim 12, wherein
a portion of the surface of the air guide disposed beneath the upper wall is recessed.

15. A vehicle air intake assembly comprising:
a vehicle fascia; and
a vehicle air induction assembly connected to the vehicle fascia, the vehicle air induction assembly including
an air guide connected to the vehicle fascia;
an air duct connected to the air guide, the air duct being configured to supply air to an engine air filter; and
a bracket member connected to the air guide and to the air duct, the bracket member having a front wall facing in a forward direction of a vehicle, a rear wall facing in a rearward direction of the vehicle, and an upper wall connecting the front wall and the rear wall,
a first air inlet in fluid communication with the air duct being defined by a surface of the air guide and the front, rear and upper walls of the bracket member, the first air inlet facing in a lateral direction of the vehicle.

16. The vehicle air intake assembly according to claim 15, wherein
a second air inlet in fluid communication with the air duct is defined by the surface of the air guide and the front, rear and upper walls of the bracket member, the second air inlet facing in the lateral direction of the vehicle.

17. The vehicle air intake assembly according to claim 15, wherein
a connecting member extends outwardly from the rear wall of the bracket member, the connecting member being disposed between the air guide and the air duct.

18. The vehicle air intake assembly according to claim 17, wherein
a portion of the surface of the air guide disposed beneath the upper wall is recessed.

19. The vehicle air intake assembly according to claim 17, wherein
a first portion of the upper wall of the bracket member tapers toward the surface of the air guide, and a second portion of the upper wall is substantially planar.

20. The vehicle air intake assembly according to claim 19, wherein
the first portion of the upper wall defines the first air inlet.

* * * * *